Aug. 7, 1956      A. R. BIEDESS      2,757,746
DRIVE TRANSMISSION FOR CRAWLER TREAD VEHICLE
Filed Feb. 18, 1953      5 Sheets-Sheet 1

INVENTOR.
Anthony R. Biedess
BY
Murray A. Gleeson
Attorney

Aug. 7, 1956 A. R. BIEDESS 2,757,746
DRIVE TRANSMISSION FOR CRAWLER TREAD VEHICLE
Filed Feb. 18, 1953 5 Sheets-Sheet 2

INVENTOR.
Anthony R. Biedess
BY
Murray A. Gleeson
Attorney

Aug. 7, 1956     A. R. BIEDESS     2,757,746

DRIVE TRANSMISSION FOR CRAWLER TREAD VEHICLE

Filed Feb. 18, 1953     5 Sheets-Sheet 4

INVENTOR.
Anthony R. Biedess
BY
Murray A. Gleeson
Attorney

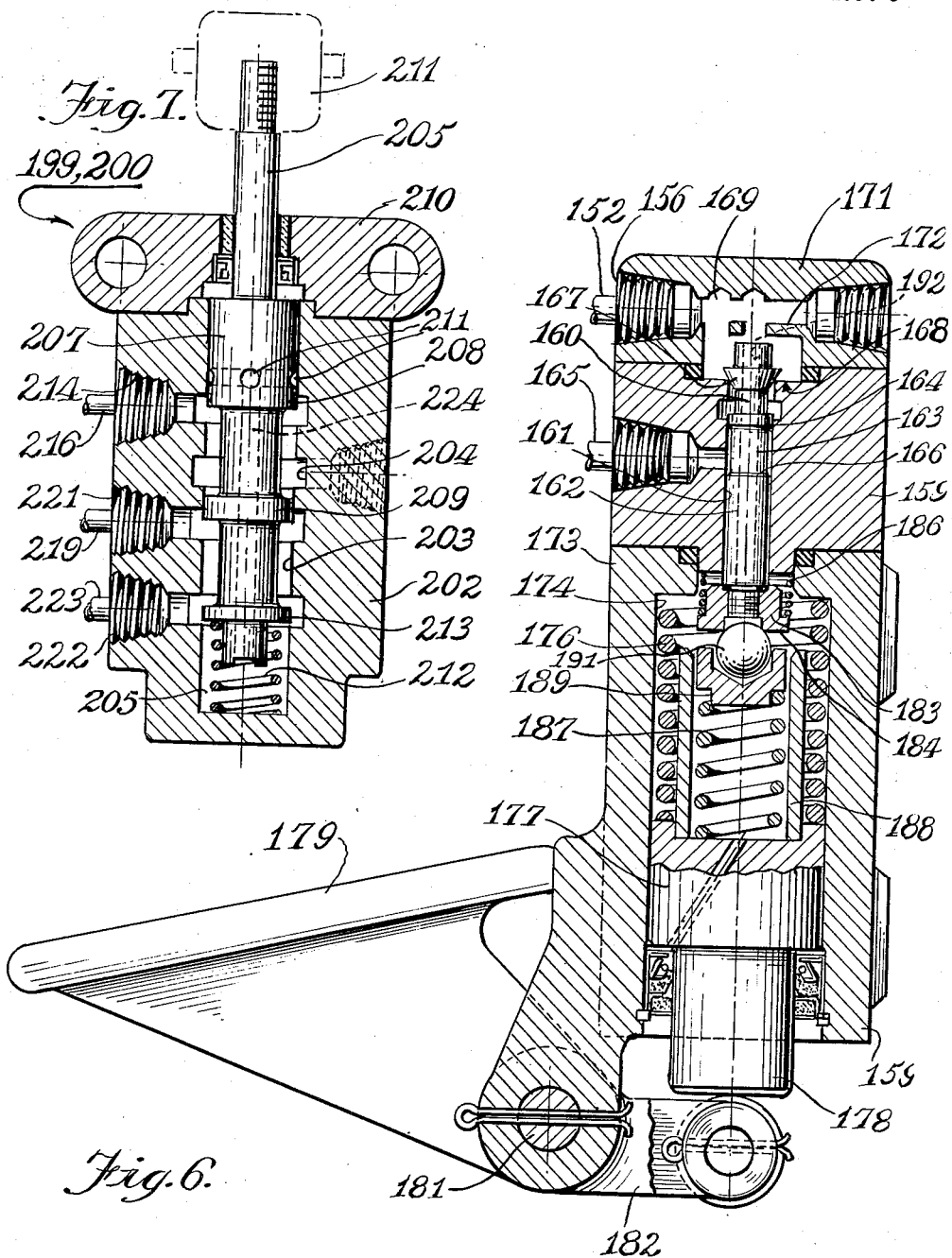

United States Patent Office 2,757,746
Patented Aug. 7, 1956

2,757,746

DRIVE TRANSMISSION FOR CRAWLER TREAD VEHICLE

Anthony R. Biedess, Chicago, Ill., assignor to Goodman Manufacturing Company, Chicago, Ill., a corporation of Illinois Application February 18, 1953, Serial No. 337,580

5 Claims. (Cl. 180—6.7)

This invention relates to crawler tread mounted vehicles and more particularly to a form of such vehicle especially suitable for excavating material in a mine or tunnel, of the type disclosed in Biedess Patent No. 2,208,205, issued July 16, 1940.

In the usual crawler tread operated vehicle the final drive is through the medium of a driving gear turning on the same center as the crawler tread sprocket, a drive pinion meshing with said driving gear and being mounted on a shaft which includes the steering clutch. The change speed mechanism associated with said last mentioned shaft are mounted on the vehicle frame which is supported on springs resting upon the track frames for the crawler treads.

During operation over irregular terrain the vehicle frame is caused to shift with respect to the track frames. Such shifting causes the driving transmission and the final driving pinion meshing with the gear driving the crawler tread sprocket to be subject to misalignment thereby necessitating the use of specially crowned shaved transmission and final drive gears.

According to the present invention the final drive to the sprockets driving the crawler treads is affected by a clutching and speed reducing mechanism, so arranged that the driving gear of such clutching and speed reducing mechanism is mounted to turn on the same center as the driving sprocket to eliminate to a large extent such misalignment as would necessitate the use of crown shaved final drive gears. The forward and reversing mechanism for the final drive shaft is mounted on the vehicle frame supported on the track frames, and is connected to the final drive shaft through the medium of a pair of forward and reverse driving chains, such chains enabling the vehicle frame to move with respect to the final drive shaft without affecting in any manner the driving connection thereto.

According to the present invention the housing enclosing such final drive shaft also affords a support for swiveling movement of the track frames supporting the crawler treads. The housing enclosing the final drive shaft is also arranged to provide a saddle for the support of the vehicle frame in such a fashion that the vehicle frame may have both vertical and torsional movement with respect to such housing.

A feature of the invention resides in providing the change speed mechanism for the drive sprocket and the drive sprocket with control mechanisms which are controlled remotely and hydraulically so that the vehicle may be readily steered in a mine tunnel or room, or rapidly moved in forward and reverse directions for the digging operations.

With the foregoing considerations in mind it is a principal object of the invention to provide a novel drive transmission for a crawler tread vehicle, characterized by the complete absence of any strains thereon resulting from the shifting movement of the vehicle frame while the vehicle is being operated over rough terrain.

Another object is to provide a change speed mechanism for such crawler tread vehicle whereby it may be readily moved forward and backward in a mucking operation.

Yet another object of the invention resides in the provision of foot operated control valves for the tramming operation, and auxiliary hand controlled valves when the vehicle is to be steered, in either direction during tramming.

Other objects and important features of the invention will be apparent from a study of specifications following taken with the drawings which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown, the scope of the invention being intended to be limited only by the breadth and spirit of the subjoined claims.

In the drawings which illustrate a preferred embodiment of the invention:

Fig. 6 is an enlarged sectional view taken through one of the tramming control valves of Fig. 5, showing the tramming control valve in the released or off position; and Fig. 7 is an enlarged sectional view through one of the steering control valves shown in Fig. 5.

Figure 1:
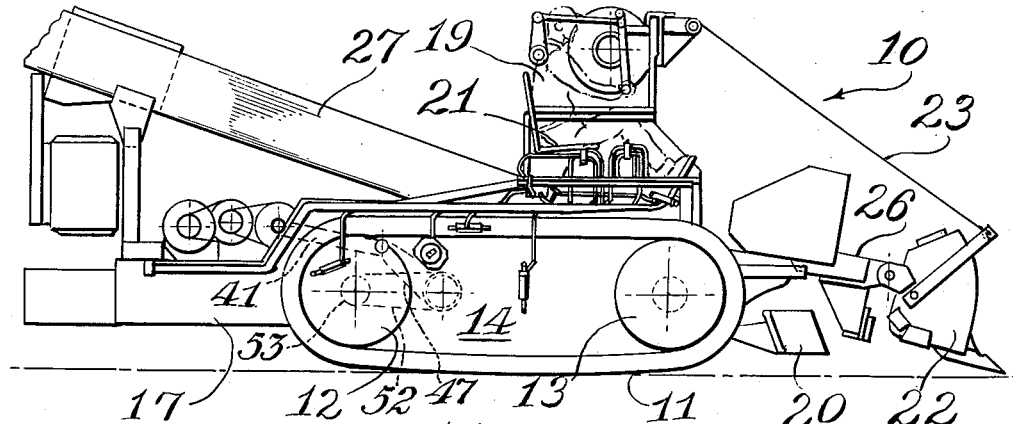
Fig. 1 is a side view of a mucking machine having embodied therein the improvements according to the present invention.
Figure 2:
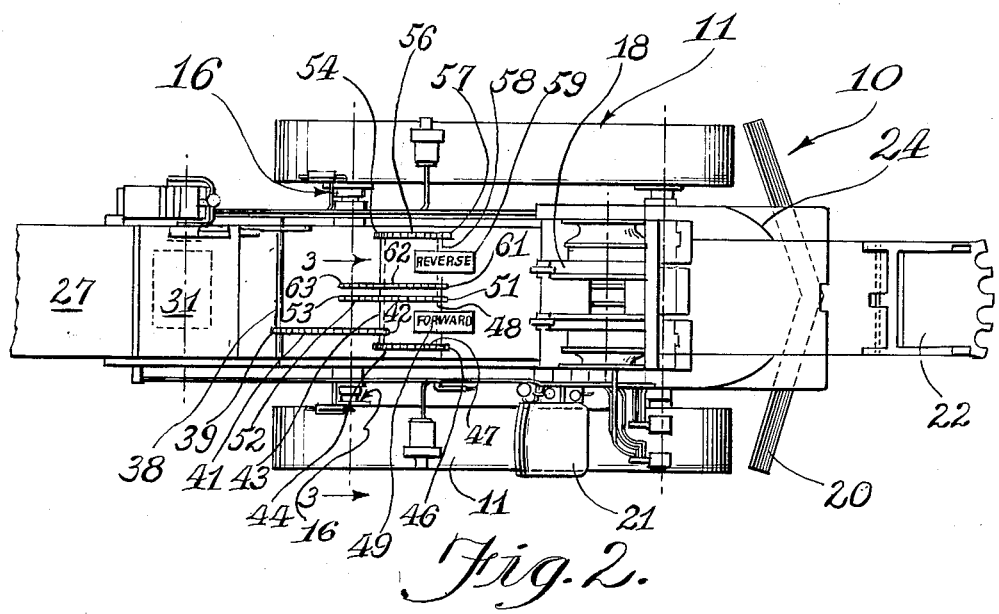
Fig. 2 is a plan view thereof.

Referring now particularly to Figs. 1 and 2 of the drawings, the improvements according to the present invention are shown as embodied in a crawler tread mounted mucking machine 10. Such a machine may be generally of a type as disclosed in Biedess Patent No. 2,208,205, issued July 16, 1940 for Mucking Machine. The machine according to the present invention, however, is mounted for tramming movement upon crawler treads 11 trained around a drive sprocket 12 and a forward idler sprocket 13, the two sprockets being supported upon track frames indicated generally by the reference numeral 14. The drive sprockets 12 are arranged to turn about a drive shaft housing 16, which is supported upon track frames 14. The housing 16 also supports a vehicle frame indicated by the reference numeral 17.

A hoisting and swinging mechanism 18 is mounted upon the vehicle frame 17, and is under the control of an operator 19 seated on an operator's seat 21 mounted to one side of frame 17. Said hoisting and swinging mechanism 18 is arranged to control the swinging and hoisting movements of a scoop or bucket 22, connected to a draft cable 23, and to be moved about a turn table 24. The bucket 22 is raised by the cable 23 with a bucket boom 26 to discharge the contents thereof upon a conveyor belt 27. Said conveyor belt is arranged to transport material from the front of the machine 10 to a raised position at the rear thereof to be discharged upon any suitable haulage vehicle, not shown.

The forward end of the vehicle frame 17 is supported upon a forward bolster, not shown, which has its ends secured adjacent the forward inner sides of the track frames 14. Springs, also not shown, may be interposed between the vehicle frame 17 and said forward bolster, so as to give resilient support to the vehicle frame 17.

A plow 20 is secured to the forward ends of the track frames 14 so that the dislodged material may be swept aside from the crawler treads 11.

The vehicle frame 17 also forms a support for a drive motor 31 for driving the crawler treads 11. Power is transmitted to the crawler treads 11 by means of a gear and chain drive transmission which may be of any desired type or design and is not herein detailed. Such transmission drives the shaft 38 having a chain drive sprocket 39 fast thereon. A drive chain 41 is trained around the chain drive sprocket 39 and is also trained around a chain drive sprocket 42 fast upon a sprocket shaft 43. One end of the sprocket shaft 43 has fast thereto a sprocket 44 which drives a forward sprocket 46 through a drive chain 47. Said forward chain sprocket 46 is fast to a shaft 48 of a forward direction planetary train 49 which drives at reduced speed a drive sprocket 51. A drive chain 52 is trained around the forward drive sprocket 51 and around a forward drive sprocket 53 turning with respect to the shaft housing, see Fig. 3.

The other end of the sprocket shaft 43 has fast thereto a sprocket 54 driving a chain 56 trained around a reverse drive sprocket 57 fast to a shaft 58 to drive a reverse direction planetary train 59. Said planetary train 59 drives at reduced speed a reverse sprocket 61 having trained therearound a drive chain 62 to drive a reverse sprocket 63 turning with respect to the shaft housing 16, see again Fig. 3.

The control of the planetary trains 49 and 59 will be described in further detail as this specification proceeds, but suffice it to say, the final drive sprockets 53 and 63 are arranged to give forward or reverse motion to the crawler tread sprockets 12, one of same only being shown in Fig. 3.

The structure now to be described in connection with Fig. 3 relates to the right hand track drive. It is to be understood that there is a corresponding left hand track drive having identical elements, except the forward and reverse sprockets 53 and 63 respectively, and that the elements of the two drives are arranged allochirally or symmetrically with relation to the center line shown in Fig. 3, and as viewed in said figure. A description of the right hand drive suffices for an understanding of both drives.

Figure 3:
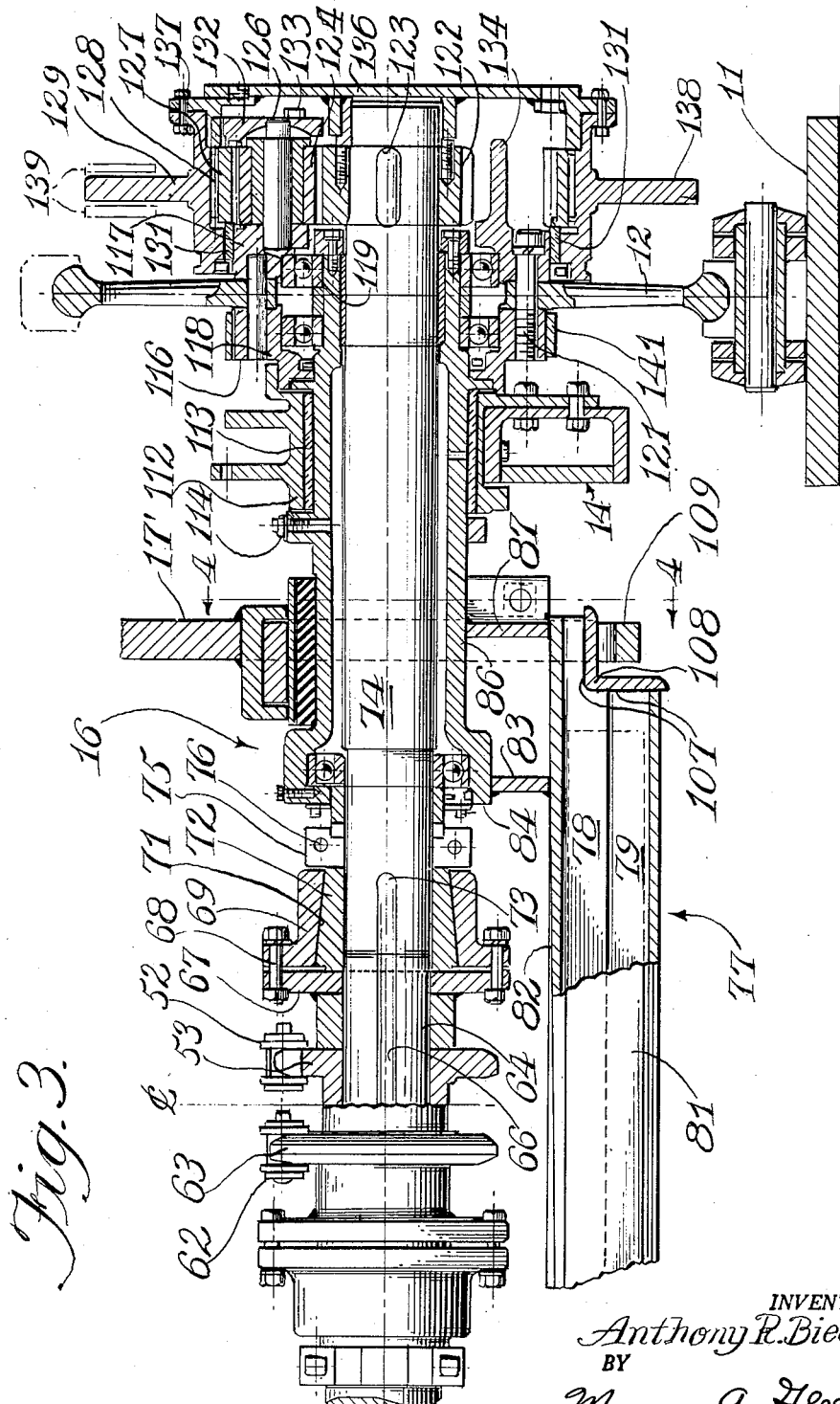
Fig. 3 is a longitudinal section view through the final drive assembly for the vehicles shown in Figs. 1 and 2, said view being taken along the line 3—3 of Fig. 2 and looking in the direction of the arrows, certain parts thereof being shown in elevation, and showing the manner in which the track frames and the vehicle frame is mounted thereon.

Referring now more particularly to Fig. 3, the forward and reverse sprockets 53 and 63 are keyed to a central stub shaft 64 by a key 66. A driving flange 67 is also keyed to the stub shaft 64 and is held by cap bolts 68 to a muff 69 having a tapered surface thereon cooperating with a split collar 72 which is held by a key 73 to a drive shaft 74 which abuts the central stub shaft 64.

The split collar 72 is additionally held in position by a clamping collar 75, which is positioned around the shaft 74 and held in position by cap bolts 76 passing therethrough, once the cap bolt 68 associated with the driving flange 67 and the muff 69 are drawn into position. It will be seen that the tapered surface 71 of the muff 69 causes the split collar 72 to be clamped firmly into engagement with the shaft 74, an additional driving connection being afforded by means of the key 66 which extends into keying engagement with the split collar 72.

As seen in Fig. 3, the shaft housing is formed in two sections and the sections are secured in the relationship shown by a rear bolster referred to generally by the reference numeral 77, and consisting of a pair of channels 78 and 79 which are disposed one on top of the other with the edges of the flanges thereof in abutting relationship, the two channels being held together by vertical plates 81 welded to the flanges of the channels 78 and 79. A web member 82 of the upper channel 78 has welded thereto a vertical support 83 which in turn is welded to the under side of an inner bell 84 of the shaft housing 16. The bell portion 84 fairs into a shaft housing portion 86 having a rectangular cross-section as seen in Fig. 4, and supported upon a vertical standard 87 which is welded to the web 82 of the upper channel 78 and to the under side of the shaft housing portion 86.

Figure 4:
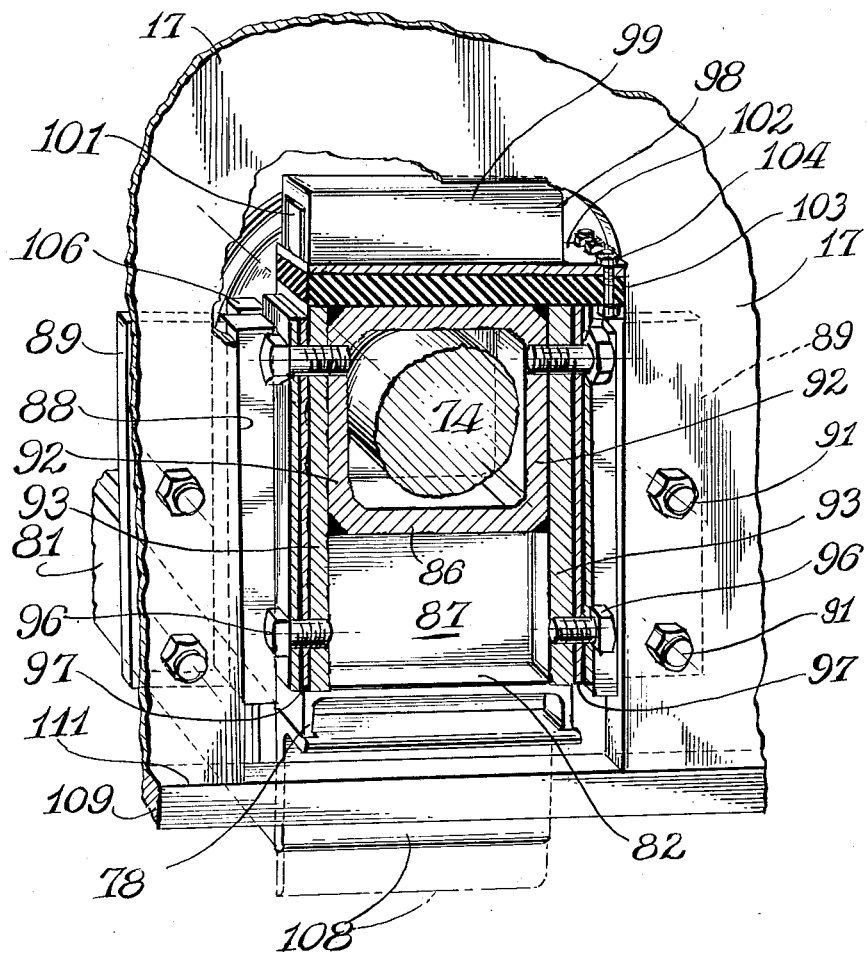
Fig. 4 is a perspective view showing the manner in which the vehicle frame is mounted for support on a saddle formed as a part of the housing enclosing the final drive for the vehicle shown in Figs. 1 and 2, said view being taken looking in the direction of the arrows 4—4 of Fig. 3.

The shaft housing portion 86 affords a support for the side member 17' of the vehicle frame 17, which as seen in Fig. 4 has a U-shaped opening therein, the open throat of the U extending downward as seen in Fig. 4. The sides of the U-shaped opening 88 are flanked by L-shaped stiffener plates 89 which are bolted to the frame member 17' as by the cap bolts 91.

The vertical walls 92 of the shaft housing portion 86 are flanked by vertical stiffener plates 93, which support shims 97 interposed between the L-shaped stiffener plates 89 and the vertical stiffener plates 93, so that the L-shaped stiffener plates 89 and the shims 97 closely fit together for sliding movement relative to each other.

The upper part of the U-shaped opening 88 in the frame 17 has welded thereto a U-shaped stirrup 98 having vertical limbs 99 which embrace a seat 101 welded along the lower edge thereof to a plate 102. A rubber plate 103 is interposed between the plate 102 and the top flat surface of the generally rectangular shaped shaft housing portion 86, the stirrup 99 and the plate 102 being held to the rubber plate 103 by cap bolts 104.

The side members 17' of vehicle frame 17 are restrained against inward movement with respect to the shaft housing 16 by means of vertical guide members 106 welded to the outer side of the vertical walls 92 of the shaft housing portion 86.

The channel members 78 and 79 forming the rear bolster 77 are notched at the end thereof as at 107, and an angle member 108 is welded to the ends of the channel members 78 and 79 and extends for the width of said channel members. A strap 109 is welded at 111 to close the U-shaped opening 88 in the side member 17'.

It will be seen that the side frame members 17' are guided by the structure described with particular reference to Figs. 3 and 4, and that the rubber plate 103 will resiliently support the vehicle frame 17 and the super structure carried thereby, the amount of upward movement of such frame member being restrained by the strap 109 closing the U-shaped opening 88.

The track frames 14 are supported for swiveling movement about the shaft housing 16, and include a hub 112 having a bushing 113 therein.

A pressure fitting 114 is arranged in the shaft housing 16 for the introduction of lubricant to the interior thereof.

The driving sprocket 12 is mounted between a pair of spaced hubs 116 and 117, which are supported respectively for turning movement with respect to the shaft housing 16 upon bearings 118 and 119 respectively. The sprocket 12 is held fast to the hubs 116 and 117 by means of cap screws 121 passing therethrough.

A driving connection is afforded between the drive shaft 74 and the sprocket 12 by means of a planetary train comprising a sun gear 122 keyed at 123 adjacent the outer end of the drive shaft 74. Said sun gear 122 meshes with planet gears 124 mounted upon stub shafts 126 supported in the hub member 117. Said planet gears mesh with an internal ring gear 127 keyed at the outer periphery thereof at 128 to a cage 129 arranged to be supported on a bushing 131 held to the outer periphery of the hub 117.

The stub shafts 126 are held in position with the planet gears 124 in meshing relationship with the sun gear 122 and the internal ring gear 127 by means of a keeper ring 132 held by cap screws 133 to a flange 134 extending from the hub 117 towards the planet gears 124.

A closure plate 136 closes the outer end of the assembly thus far described, and turns with the cage 129, being secured thereto by cap bolts 137.

The planetary driving mechanism thus far described is arranged to have a clutching connection with the drive sprocket 12, and to this end the cage 129 has a flange 138 which is engaged by a pair of clutching plates 139, forming part of a clutching and braking mechanism as described in a copending application of Biedess, Serial No. 325,349, filed December 11, 1952, for Improvements in Brakes. When the brake discs 139 engage the flange 138 therebetween it will be seen that the sun gear 122 turning with the shaft 74 will drive the planet gears 124 in an orbital path at the same time turning the drive sprocket 12 about the shaft housing 16.

During periods of non-operation the driving sprockets 12 may be braked by means of a band brake 141 encircling the hub 118. The precise details of the brake 141 form no part of the present invention and instead of the band brake shown, a two shoe mechanical or hydraulically operated brake may be substituted as well. Each band brake 141 is arranged to cooperate with the opposite planetary clutch 138, 139 for turning of the vehicle as will appear in more detail as this specification proceeds.

Figure 5:
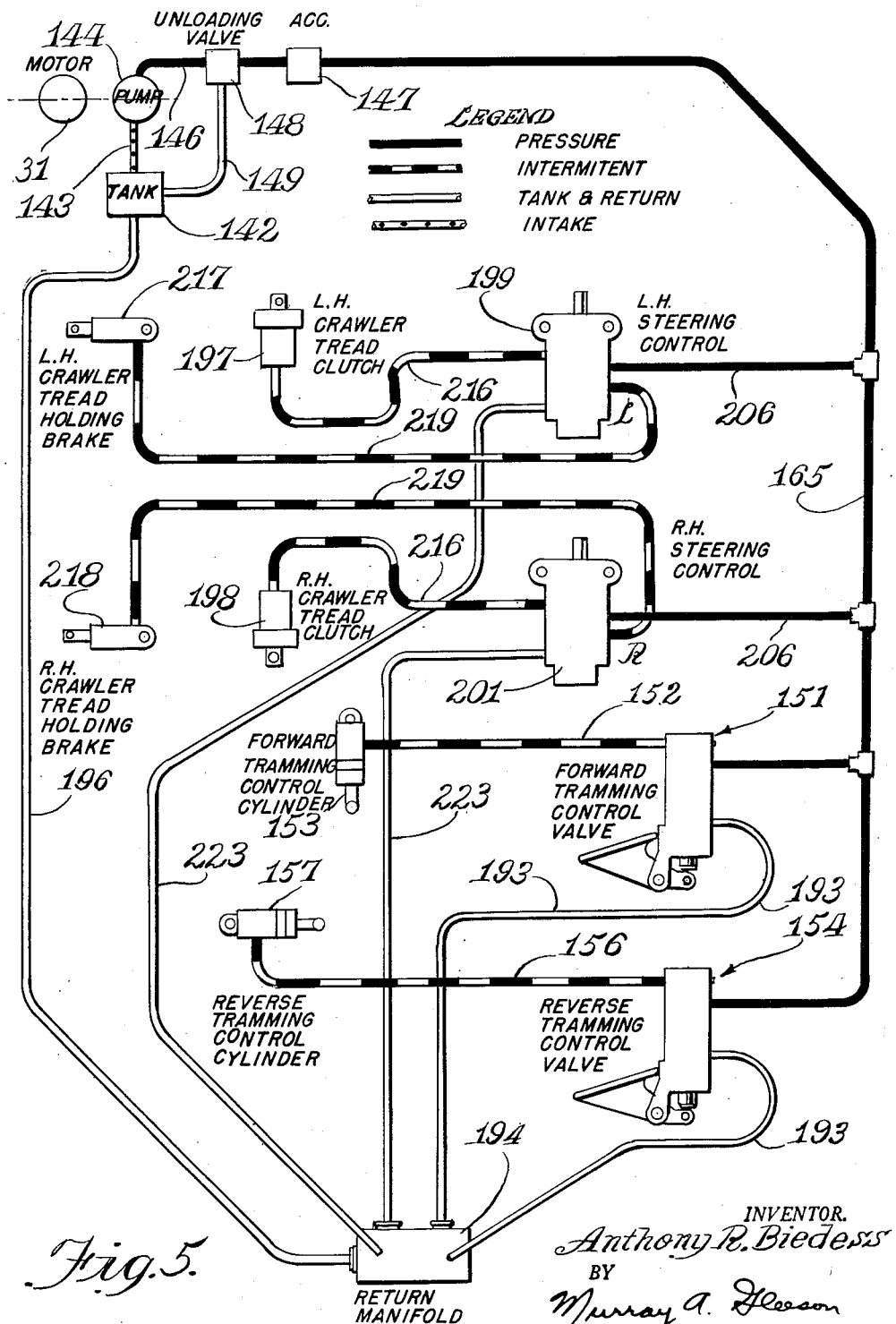
Fig. 5 is a schematic diagram showing a fluid pressure system and various control and controlled elements connected therewith for operating the drive mechanism shown in Figs. 1, 2 and 3.

Referring to Fig. 5 of the drawings, there is shown a fluid pressure system for controlling the actuation in a forward and reverse direction of the drive sprocket 12, the actuation of the brake discs 139 for effecting the driving connection between the shaft 74 and the drive sprocket 12 and the actuation of the band brake 141 in holding the mechanism in braked position and for controlling the steering of the mechanism by means of alternate braking and release of the band brakes 141 and alternate clutching and release of the planetary clutches 138, 139. The fluid pressure system of Fig. 5 consists of a tank or reservoir 142 connected by a line 143 to a pump 144 which may be driven by any convenient power take-off from the motor 31 mounted on the frame 17. Fluid under pressure from the pump 144 passes by way of a line 146 to an accumulator 147 where the fluid is stored under pressure. An unloading valve 148 is interposed in the line between the pump 144 and the accumulator 147 to spill fluid at excess pressure by means of a line 149 back to the tank 142.

The operation of the forward direction planetary train 49 for driving the forward drive sprocket 53 is under the control of a forward tramming control valve indicated generally by the reference numeral 151. Said forward tramming control valve controls the application of pressure fluid by way of a pressure line 152 to a forward tramming control cylinder 153 controlling the operation of the forward planetary train 49.

The operation of the reverse direction planetary train 59 is controlled by a reverse tramming control valve indicated generally by the reference numerals 154, which controls the application of pressure fluid by way of a line 156 to a reverse tramming control cylinder 157 for operating the reverse direction planetary train 59.

Each of the tramming control valves 151 and 154, see Fig. 6, consists of a valve body 159 having a bore 161 therein. A plunger 162 is shiftable within the bore 161, and has a portion of reduced diameter 163 spacing a pair of lands 164 and 166. A valve poppet 167 is spaced from the land 164 by a portion of reduced diameter 160 and formed integrally with the plunger 162 to close upon a seat 168 formed by the bore 161. The bore 161 intersects with a pressure passageway 169 formed in an end cap member 171 secured to the valve body 159 in any convenient fashion. The movement of the poppet valve portion 167 from its seat 168 is limited by a stop 172 formed in the working port 171.

Means are provided for moving the plunger 162 and lifting the poppet 167 from its seat 168 so that pressure fluid is directed from a pressure line 165 connected to the accumulator 147 and to the lines 152 and 156 supplying respectively the tramming control cylinders 153 and 157. To this end the valve body 159 has secured thereto a valve spring housing 173 having a bore 174 mounting a spring 176. The spring 176 is compressed by a plunger 177 continuous with a push rod 178 which is moved by a foot pedal 179 having a fulcrum point 181 on the valve spring body 173 and a rock arm 182 bearing against the push rod 178.

The end of the valve plunger 162 extending into the bore 174 is fitted with a ball seat 183 having a flange 184 forming an abutment for a spring 186 which bottoms against one end of the valve body 159, so that the poppet 167 is normally urged upon its seat 168. A valve spring 187 is guided within a sleeve 188 which separates the springs 187 and 176 from each other, one end of the spring 187 being bottomed against the plunger 177 and the other end of the spring being bottomed against a ball seat 189. A ball valve 191 is retained between the two ball seats 183 and 189, and when the valve 151, 154 is in the position shown in Fig. 6, the ball 191 normally rests upon the seat 189, sufficient clearance being afforded for the ball 191 so that the poppet 167 is urged against its seat 168 by the spring 186. However, when the foot treadle 179 is rocked about its fulcrum 181 the lost motion at the ball 191 will be taken up by the ball seat 189, and further movement of the foot treadle 179 will lift the poppet 167 from its seat, to cause pressure fluid to move from the pressure line 165 to the line 152 to operate either tramming cylinder 153 or tramming cylinder 157.

When the foot treadle is released to the position shown in Fig. 6 fluid is exhausted from the cylinder 153 or 157 by means of an exhaust passageway 192 coaxial with the plunger 162, and when the ball 191 is released from its seat at 184, fluid from the cylinder 153 or 157 will be ported to an exhaust line 193 to move to a return manifold 194 to be subsequently returned to the tank 142 by a return line 196.

The description thus far with reference to Figs. 5 and 6 of the drawings causes either the forward planetary train 49 or the reverse planetary train 59 to be operated to turn either the forward drive sprocket 53 or the reverse drive sprocket 63.

During the condition thus far described fluid will be admitted to both of a pair of crawler tread clutch operating cylinders 197 and 198. These are respectively connected to the pressure line 165 through a left steering control valve 199 and a right steering control valve 201. Referring now to Fig. 7 of the drawings, said steering control valves each consists of a valve body 202 having a bore 203 therein which is intersected by a pressure port 204 connected by a pressure line 206 branching from the pressure supply manifold 165. A valve plunger 207 is shiftable within the bore 203 and has spaced lands 208, 209 thereon. The valve plunger 207 has a stem 205 of smaller diameter extending through an end cap 210 secured to the valve body 202 in any convenient manner. The stem 205 has an actuating handle 211 thereon and movement of the actuating handle 211 and the plunger 207 is opposed by a spring 212 bottomed at one end of the bore 203 and at the other end against shoulder 213 disposed near the end of the plunger 207. In the position shown in Fig. 7 pressure fluid is directed from the pressure port 204 and out a port 214 connected to a line 216 to supply the crawled tread clutch cylinders 197 and 198.

The supplying of both of the cylinders 197 and 198 causes both of the friction disks 139 shown in Fig. 3 to engage the flange 138 thereby to effect a driving connection between the shaft 74 and the drive sprocket 12 for tramming movement of the vehicle 10.

In the position of the valves 199 and 201 shown in Fig. 7, a pair of crawler thread holding brake cylinders 217 and 218 will be connected to exhaust by a line 219 to a port 221 which communicates with a tank port 222 and a line 223 connected to the return manifold 194. Under such condition both of the band brakes 141 will be released, thereby releasing the sprocket 12 so that same may be driven when the clutching connection is afforded by the engagement of the flange 138 by the friction disc 139.

The machine according to the present invention is arranged to be steered by driving one of the crawler treads 11 while the other is braked. By way of example, the vehicle may be steered to the left by actuation of the steering control valve 199 while the forward tramming control valve 151 is actuated. The valve plunger 207 of valve 151 is pushed against the load in the spring 212 to cause the land 208 to span the port 214 and to cause the land 209 to close communication of the port 221 with the tank port 222 and to cause the pressure fluid at the port 204 to be diverted to the line 219. Under such condition the left hand crawler tread clutch operating cylinder 197 will be connected to the tank port by means of a passageway 224 coaxial with the plunger 207 and extending from lateral openings 211 near the upper end to the lower end thereof so that the fluid within the cylinder 197 will be exhausted to the return manifold by way of the line 223, chamber 205 and part 222. Under such condition pressure fluid from the tank port 204 will be diverted to the left hand crawler tread holding brake cylinder 217 to cause the band brake 141 thereof to be engaged, thereby holding the left hand drive sprocket 12. It will be seen that the vehicle 10 will be driven on its right hand crawler tread 12 while the opposite one is held stationary by the holding brake 141. Obviously, the right steering control valve 201 may be actuated instead of the valve 199 so as to cause the vehicle to be steered in the opposite direction.

It will be apparent of course that the vehicle may be readily steered in either the forward or reverse direction depending upon whether the forward or reverse tramming control valve is being actuated.

While the invention has been described in terms of a preferred embodiment thereof, the scope thereof is intended to be limited only by the terms of the claims here appended.

I claim as my invention:

1. In a drive transmission for a crawler tread operated vehicle, a pair of aligned shaft housings axially spaced from each other, a bolster connecting said housings, a drive shaft turning within each shaft housing, a central shaft fixedly connected to said drive shafts and supporting a pair of separate driving elements, flexible driving members driving said driving elements, a track frame supported on each of said shaft housings, means to swivel said track frames about said shaft housings, track engaging sprockets rotatably mounted on housings disposed near said track frames in axial alignment with said drive shafts, means affording a driving connection between said drive shafts and said sprockets comprising a sun gear mounted adjacent the outer end of each drive shaft, a spider carrying at least one planet gear turning with each of said sprockets, an internal ring gear meshing with said planet gear, gear control brake means selectively operable for holding said ring gears against rotation during driving of said sprockets, brake means selectively operable to hold said sprockets against rotation, selectively operable means for controlling the operation of said flexible driving members to control said separate driving elements, and other means for selectively controlling the means holding said ring gear and said sprockets against rotation.

2. In a drive transmission for a crawler tread operated vehicle, a pair of aligned shaft housings axially spaced from each other, a bolster connecting said housings, a drive shaft turning within each shaft housing, a central shaft fixedly connected to said drive shafts and supporting a pair of separate driving elements, flexible driving members driving said driving elements, a track frame supported on each of said shaft housings, means to swivel said track frames about said shaft housings, track engaging sprockets rotatably mounted on said housings disposed near each track frame in axial alignment with said drive shafts, means affording a driving connection between said drive shafts and said sprockets comprising a sun gear mounted adjacent the outer end of each drive shaft, a spider carrying at least one planet gear turning with each of said sprockets, an internal ring gear meshing with said planet gear, gear control brake means selectively operable for holding said ring gear against rotation during driving of said sprockets, brake means selectively operable to hold said sprockets against rotation, selectively operable means for controlling the operation of said flexible driving members to control said separate driving elements, and other means for controlling the means holding said ring gear against rotation, each of said other controlling means being individually operable for selectively controlling the steering of said vehicle by operation of one of said brake means and operation of the opposite driving connection means.

3. A crawler tread operated vehicle comprising a pair of aligned shaft housings axially spaced from each other, a bolster connecting said housings, a drive shaft turning within each shaft housing, a central shaft fixedly connected to said drive shafts and supporting a pair of separate driving elements, flexible driving members driving said driving elements, a track frame supported on each of said shaft housings, means to swivel said track frames about said shaft housings, track engaging sprockets rotatably mounted on said housings disposed near said track frames in axial alignment with said drive shafts and arranged to rotate with respect to said shaft housings, means affording a driving connection between said drive shafts and said sprockets comprising a sun gear mounted adjacent the outer end of each drive shaft, a spider carrying at least one planet gear turning with each of said sprockets, an internal ring gear meshing with said planet gear, and means holding said ring gear against rotation during driving of said sprockets.

4. The structure defined in claim 1 wherein the pair of driving elements are sprockets.

5. The structure defined in claim 4 including a forward drive means for one of said flexible driving members for driving one of said driving sprockets and an independent reverse drive means for the other of said flexible driving members for driving the other of said driving sprockets.

References Cited in the file of this patent

UNITED STATES PATENTS

| | | |
|---|---|---|
| 1,118,835 | Adams | Nov. 24, 1914 |
| 1,305,506 | Townsend | June 3, 1919 |
| 1,424,446 | Buckendale | Aug. 1, 1922 |
| 2,254,083 | Nickles et al. | Aug. 26, 1941 |
| 2,328,606 | Boldt | Sept. 7, 1943 |
| 2,384,182 | Lewis | Sept. 4, 1945 |
| 2,416,478 | Harbers | Feb. 25, 1947 |
| 2,495,057 | Dillingham | Jan. 17, 1950 |

FOREIGN PATENTS

| | | |
|---|---|---|
| 514,219 | Germany | Dec. 11, 1930 |